March 24, 1970 — D. S. CAMPBELL ET AL — 3,502,442
SALT PLATFORM AND SEAL ARRANGEMENT
Filed Dec. 19, 1968
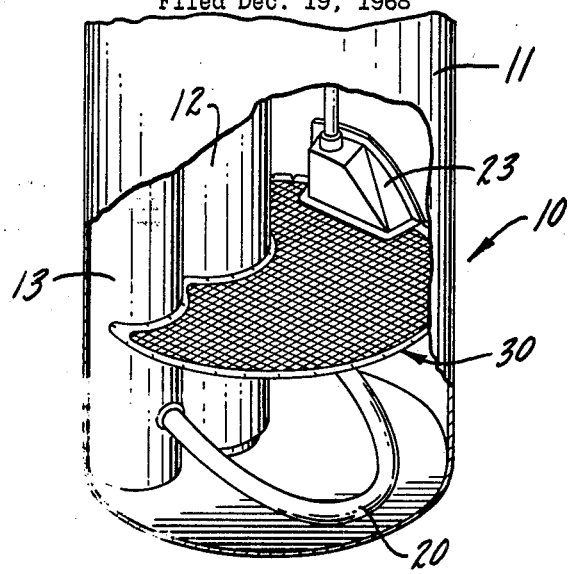
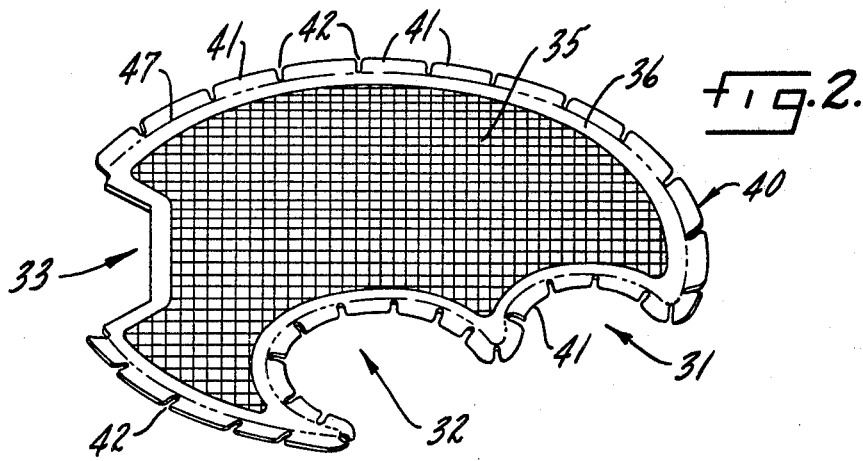
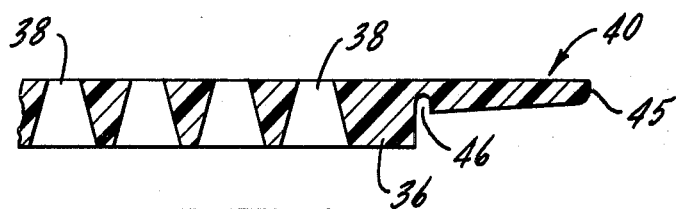
INVENTORS.
DONALD S. CAMPBELL
RAYMOND A. TESSIER
BY Hume, Clement Hume & Lee
Attorneys.

3,502,442
SALT PLATFORM AND SEAL ARRANGEMENT
Donald S. Campbell, North St. Paul, and Raymond A. Tessier, White Bear, Minn., assignors to Union Tank Car Company, Chicago, Ill., a corporation of Delaware
Filed Dec. 19, 1968, Ser. No. 785,147
Int. Cl. B01f 1/00
U.S. Cl. 23—272.6          1 Claim

ABSTRACT OF THE DISCLOSURE

A salt plaform and seal arrangement for retaining a salt bed in the brine drum of a water conditioning system. The plaform and the seal are formed unitarily of plastic. The seal comprises a flexible gasket edge formed in sections which flex individually to adapt to wall configuration. A narrow, particle tight seal is established in the brine drum by merely inserting the platform; subsequently the platform is easily removed.

BACKGROUND OF THE INVENTION

This invention relates in general to a water conditioning system. It deals more particularly with the regeneration of ion exchange material in such a system.

Water softening with ion exchange material such as resin particles or the like is well-known in the art. During the softening process, or service cycle, the ion exchange resin particles acquire hardness inducing ions from the water in exchange for "soft" ions, or ions which do not induce hardness. After prolonged contact of the resin particles with raw water, their ion exchange capacity is diminished considerably and regeneration of the resin particles must be accomplished, conventionally by contacting the resin particles with a brine solution, i.e., an aqueous solution of sodium chloride or potassium chloride or the like.

The ion exchange process and the regeneration of ion exchange material are accomplished in a softener or resin tank of well-known construction, while a brine tank is conventionally employed to manufacture and store brine between regeneration cycles. In practice, the resin tank is frequently mounted within the brine tank, which is substantially larger in diameter, to make a more compact unit.

When regeneration is initiated in the system by a suitable timing means, brine is drawn from the brine tank and passed through the bed of ion exchange material in the softener tank to reverse the exchange of ions and revitalize the bed by removing hardness-inducing ions and replacing them with sodium ions, for example, from the brine solution. After the brine cycle, the brine tank is refilled to a predetermined level with fresh water. The fresh water rises to cover a salt platform disposed in the brine tank. The salt platform carries a predetermined amount of pelletized sodium chloride, for example, in a layer on its upper surface. Sufficient salt goes into the solution to form a saturated brine solution in the brine tank at ambient temperature.

The salt platform is conventionally fabricated of metal or plastic and is perforated to facilitate the passage of water and brine solution through it while the salt particles are retained on its upper surface. For an example of the platform and tank arrangement generally, reference is made to the co-pending application of Benjamin H. Kryzer et al., Ser. No. 422,725, filed Dec. 31, 1964, now U.S. Patent 3,442,624 entitled Water Conditioning System, and assigned to the same assignee as the present invention. According to present practice, a separate gasket is provided around the rim of the salt platform to prevent salt granules from falling to the bottom of the brine well.

In brine draw systems generally of the aforedescribed character, a consistent problem has developed in providing a suitable seal around the periphery of the salt platform. With a platform that does not seal well, salt pellets or smaller particles drop into the bottom of the drum and, because the brine solution is 100% saturated, the particles do not dissolve. When enough particles have fallen through, the quantity of brine is reduced and also interference can occur with the brine draw mechanism.

Various types of salt platform seals have been tried, but each seems only to have its own new problems. An example of one such seal presently employed is a separate foam gasket arrangement. Unfortunately, such an arrangement actually decreases the exposed platform aperture area, and also increases "bridging" problems or uneven passage of water through the salt bed across unapertured areas of the platform; around the periphery of the gasket, for example.

SUMMARY OF THE INVENTION

The present invention is embodied in an improved salt platform and seal arrangement for a brine tank in a water conditioning system. It is a primary object of the present invention to provide a salt platform which unitarily incorporates a peripheral seal for preventing salt pellets or salt granules from falling into the bottom of the brine well. It is another object to provide a salt platform seal which occupies minimal space in the brine well, and, accordingly, permits the platform to be apertured to a point immediately adjacent its periphery. It is yet another object to provide a salt platform seal which readily adapts to irregularities in the wall of a brine well while maintaining a consistently superior seal. It is still another object to provide a unitary salt platform and seal arrangement which is simpler and less expensive than broadly similar salt platforms and seal assemblies presently in use.

The foregoing and other objects are realized in accord with the present invention by providing a unitary salt platform and seal arrangement fabricated of plastic. The unitary salt platform and seal arrangement is preferably injection molded of polypropylene or the like. The platform and seal arrangement consists of an aperture grill-work with a narrow solid border around its periphery. The solid border is maintained in sealing contact with the brine drum, the brine well, and the mineral tank, by a gasket edge formed unitarily with the border of the platform. The gasket edge includes alternating gasket sections and radially extending slots, the slots being relatively narrow and separating the gasket sections. The gasket sections are much thinner than the solid border of the platform proper, are quite flexible, and taper toward even thinner edges.

In its normal, or as molded condition, the gasket edge lies flat, in the same plane as the salt platform. In use, the diameter of the platform, including the gasket edge, is greater than the inside of the brine drum. Accordingly, the gasket edge sections are forced upwardly at approximately a 45° angle when the platform is installed in the drum. When the brine well and mineral tank are then installed in the drum, through the platform, the gasket edge sections in the area of these components are forced downwardly at approximately a 45° angle. A salt tight seal is established around the entire periphery of the platform, regardless of whether the brine well walls are slightly irregular.

The invention, together with its construction and method of operation, along with other objects and advantages thereof, is illustrated more or less diagrammatically in the drawing, in which:

FIGURE 1 is a perspective view of a water conditioning system incorporating a salt platform and seal arrangement embodying features of the present invention, with parts broken away;

FIGURE 2 is a perspective view of the salt platform and seal arrangement with its gasket edge sections in operational relationship, and FIGURE 3 is an enlarged sectional view taken through an edge of the salt platform and seal arrangement.

Referring now to the drawing, and particularly to FIGURE 1, a water conditioning system incorporating a salt tray and seal arrangement and embodying features of the present invention is illustrated generally at 10. The system 10 includes a brine drum 11 having a smaller diameter treatment tank 12 mounted therein. Immediately adjacent the treatment tank 12, also within the brine drum 11, is a brine well 13. Mounted on the cover of the drum 11 is a system controller (not shown).

Extending from the base of the brine well 13 within the drum 11 is a brine hose 20. The free or open end of the brine hose is connected by the flexible plastic member through a housing arrangement 23 and suitable guide tube to a brine draw adjustment and indicator mechanism associated with the controller.

Mounted within the brine drum 11, about three-quarters of the way down, is a horizontally disposed salt platform and seal arrangement 30 embodying features of the present invention. The salt platform and seal arrangement 30 is unitarily formed and is adapted to support a layer of pelletized or granular sodium chloride or the like while maintaining a particle-tight seal around its periphery with the adjacent inner surface of the brine drum 11, the outer surfaces of the treatment tank 12 and the brine well 13, and the housing 23 within the brine drum.

Referring now to FIGURES 2 and 3, the salt platform and seal arrangement 30 is illustrated in greater detail. FIGURE 2 illustrates the platform and seal arrangement in perspective view in its installed configuration. The solid line sectional drawing of FIGURE 3 illustrates a portion of the platform and seal arrangement in its normal, or un-installed, configuration.

The salt platform and seal arrangement 30 is, as recognized in FIGURE 2, generally circular in plan configuration, although it might be any shape. It does, however, have peripheral cut-outs 31, 32 and 33 corresponding to the external cross-sectional configurations of the brine well 13, the treatment tank 12 and the housing 23 within the brine drum 11, with which the periphery of the salt platform and seal arrangement mates.

The platform and seal arrangement 30 comprises a centrally disposed grill-work 35 having a solid border 36 surrounding it. The grill-work 35 and border 36 are of identical thickness and fabricated of plastic, preferably polypropylene as has been pointed out. Fabrication is preferably by injection molding. The apertures 38 in the grill-work 35 are formed during the molding process.

Extending outwardly from the border 36 of the platform and seal arrangement 30, around its entire periphery, with the exception of the cut-out area 33 of the housing 23, is a gasket edge 40 formed unitarily with the border 36 and the grill-work 35. The gasket edge 40 comprises a series of gasket sections 41 separated by radially extending slots 42. Each gasket section is slightly less than half as thick as the border 36 and grill-work 35 of the platform and seal arrangement 30, and tapers slightly toward its outer end 45. Each of the gasket sections 40 is grooved at 46 at its juncture with the border 36 of the platform and seal arrangement 30 to enhance its flexibility about a circumferential juncture line 47.

In assembling the water conditioning system 10, the housing 23 with its depending flexible member 22 and hose 20 is first mounted in the brine drum 11 against the side wall of the drum. The housing 23 is shaped to fit snugly against the side wall of the drum and is suitably supported from the base of the drum. With the housing 23 in place, the salt platform and seal arrangement 30 is forced downwardly into the drum 11 from its open top (with the cover removed).

It will be recalled that the outside diameter of the platform border 36, at the groove 46, is slightly less than the inside diameter of the drum 11 side wall. On the other hand, the outside diameter of the gasket edge 40 at the gasket section outer ends 45 is somewhat greater than the inside diameter of the drum 11 side wall. Accordingly, as the salt platform and seal arrangement 30 is forced downwardly in the drum 11, in its horizontal, operational position, the gasket edge sections 41 which engage the drum 11 side wall are flexed upwardly, in the manner illustrated in FIGURE 2. This upward flex is such that the corresponding gasket edge sections 41 define an angle of between 30° and 60°, preferably 45°, with the plane of the salt platform. In flexing upwardly, out of the plane of the salt platform, adjacent gasket edge sections move closer together, actually coming into contact at corresponding slots 42.

The salt platform and seal arrangement 30 is forced downwardly until the cut-out 33 snugly fits around the housing 23. In its proper position, as illustrated in FIGURE 1, the platform, at the cut-out 33, rests tightly against a rim formed around the inwardly disposed sides of the housing 23.

In the next assembly step of the water conditioning system 10, the brine well 13 is forced downwardly past the salt platform and seal arrangement 30 through its cut-out 31. In passing through the cut-out 31, the brine well 13 flexes the corresponding gasket edge sections 41 downwardly to approximately a 45° angle to the plane of the salt platform. In this relationship, the gasket edge sections 42 in the cut-out 31 actually come into edge contact with each other at corresponding slots 42. At this point, the hose 20 is connected to the base of the brine well 13 by manipulation through the cut-out 32 which remains for the treatment tank 12.

After this assembling step, the treatment tank 12 is seated in the drum 11 by forcing it downwardly past the salt platform and seal arrangement through its cut-out 32. Once again, in the manner described in relationship to the introduction of the brine well 13, corresponding gasket sections 41 are flexed downwardly to an angle of approximately 45° to the plane of the salt platform.

With the salt platform and seal arrangement 30 seated in the drum 11 in the aforedescribed manner, a seal is formed between the walls of the drum 11, the treatment tank 12, and the brine well 13, by the gasket seal 10. The seal is extremely effective in retaining salt particles on top of the platform. Individual gasket edge sections 41 flex separately to adapt in configuration to irregularities in the wall contour.

Furthermore, the width of the solid border 36 and gasket sections 41 is, collectively, so small that the area of the grill-work 35 is minimal; only slightly less than the over-all surface area of the platform and seal arrangement 30. Accordingly, undissolved salt does not tend to collect at the border 36.

The salt platform and seal arrangement 30 is, as will be clearly recognized, easy to mount and remove for cleaning if necessary. In this light, salt platforms require relatively frequent cleaning where unrefined treatment salt is commonly employed; in the western part of the United States, for example. The simplicity and, accordingly, relatively inexpensive construction of the platform and seal arrangement 30 is readily seen.

While the embodiment described herein is at present considered to be preferred, it is understood that various modifications and improvements may be made therein, and it is intended to cover in the appended claim all such modifications and improvements as fall within the true spirit and scope of the invention.

What is desired to be claimed and secured by Letters Patent of the United States is:

1. In a brine draw system including a brine drum, the improvement in salt platform and seal arrangement mounted inside the brine drum between the side walls defining the brine well, comprising:
   (a) a molded plastic platform including central grill means and a solid border formed around said grill means, said grill means and said border being in the same plane and of substantially the same thickness,
   (b) gasket edge means formed unitarily with said border about the entire periphery of said border and normally extending outwardly from said border generally in the plane of said grill means and border, the upper surface of said solid border and said gasket edge means being substantially in the same plane,
   (c) said gasket edge means including alternating gasket edge sections separated by slots extending outwardly from said border,
   (d) generally circumferential groove means formed in the bottom inner edge of said gasket edge means adjacent to its juncture with said solid border,
   (e) said gasket edge means being of a thickness less than said border and tapering toward its outer tip means so as to be relatively thinner at said outer tip means that at said inner edge,
   (f) said gasket edge means being flexed out of the plane of said grill means and border and in sealing relationship against said side wall when said platform is opertionally arranged in said brine drum.

References Cited

UNITED STATES PATENTS

| | | | |
|---|---|---|---|
| 1,026,500 | 5/1917 | Elledge | 23—272 |
| 2,642,188 | 6/1953 | Layte | 210—450 X |
| 2,802,724 | 8/1957 | Johnson | 23—272 X |
| 3,089,508 | 5/1963 | Schulze | 23—272 X |
| 3,190,726 | 6/1965 | Rudelick | 23—267 |
| 3,374,891 | 3/1968 | Buchmann | 210—191 X |
| 3,421,631 | 1/1969 | Hirsch | 210—450 X |

FOREIGN PATENTS 936,396　9/1963　Great Britain.

NORMAN YUDKOFF, Primary Examiner

S. J. EMERY, Assistant Examiner

U.S. Cl. X.R.

23—272, 311, 312; 210—191; 239—310